United States Patent [19]
Walker et al.

[11] Patent Number: 5,649,612
[45] Date of Patent: Jul. 22, 1997

[54] BRAKE BRACKET ASSEMBLY

[75] Inventors: Donald G. Walker, Troy; David J. Dettloff, Utica; David J. Edwards, Shelby Twp., all of Mich.

[73] Assignee: Rockwell International Corporation, Pittsburgh, Pa.

[21] Appl. No.: 709,018

[22] Filed: Apr. 3, 1996

Related U.S. Application Data

[63] Continuation of Ser. No. 282,179, Jul. 29, 1994, abandoned.

[51] Int. Cl.$^6$ ........................................... F16D 51/22
[52] U.S. Cl. .................................... 188/329; 188/330
[58] Field of Search ............................... 188/78, 205 A, 188/205 R, 325, 326, 329, 330, 331, 341; 403/359, 361, 368, 370

[56] References Cited

U.S. PATENT DOCUMENTS

| | | | |
|---|---|---|---|
| 1,984,454 | 12/1934 | Belyavin | 403/367 |
| 3,720,429 | 3/1973 | Friedrichs et al. | 403/367 |
| 4,200,174 | 4/1980 | Borugian et al. | 188/329 |
| 4,615,640 | 10/1986 | Hosokawa | 403/370 |
| 4,907,678 | 3/1990 | Urban | 188/330 |
| 4,981,200 | 1/1991 | Gee | 188/330 |
| 4,988,231 | 1/1991 | Pettit | 403/370 |
| 5,174,680 | 12/1992 | Nakamura et al. | 403/370 |
| 5,190,393 | 3/1993 | Svensson | 403/370 |
| 5,309,620 | 5/1994 | Shinohara et al. | 403/359 |
| 5,318,574 | 6/1994 | Rumberger | 403/370 |

FOREIGN PATENT DOCUMENTS

| | | | |
|---|---|---|---|
| 846207 | 6/1952 | Germany | 188/78 |

*Primary Examiner*—Robert J. Oberleitner
*Assistant Examiner*—Chris Schwartz

[57] ABSTRACT

An improved bracket member for a vehicle brake system is disclosed. The bracket member has a wing bracket at one end for mounting of a brake actuating mechanism and a mounting plate at the opposite end for connection to the spider of the brake assembly. A hollow tubular member is positioned between the wing bracket and mounting plate and securely affixed to each of them, such as by welding. The tubular member can be of any length depending on the vehicle and applicable clearance space. The mounting plate is secured such as by fasteners to the brake assembly. Also, the tubular member protrudes through the mounting plate and is adapted to be separately securely connected to the brake assembly. The end of the tubular member can be securely attached to an opening in the brake assembly in a number of ways, such as by an interference fit, press fit, wedge fit, compression fit in combination with a spanner nut, pinch joint or the like. The end of the tubular member can also be knurled or splined. In another embodiment, the end of the tubular member can be welded to the brake assembly spider.

5 Claims, 3 Drawing Sheets

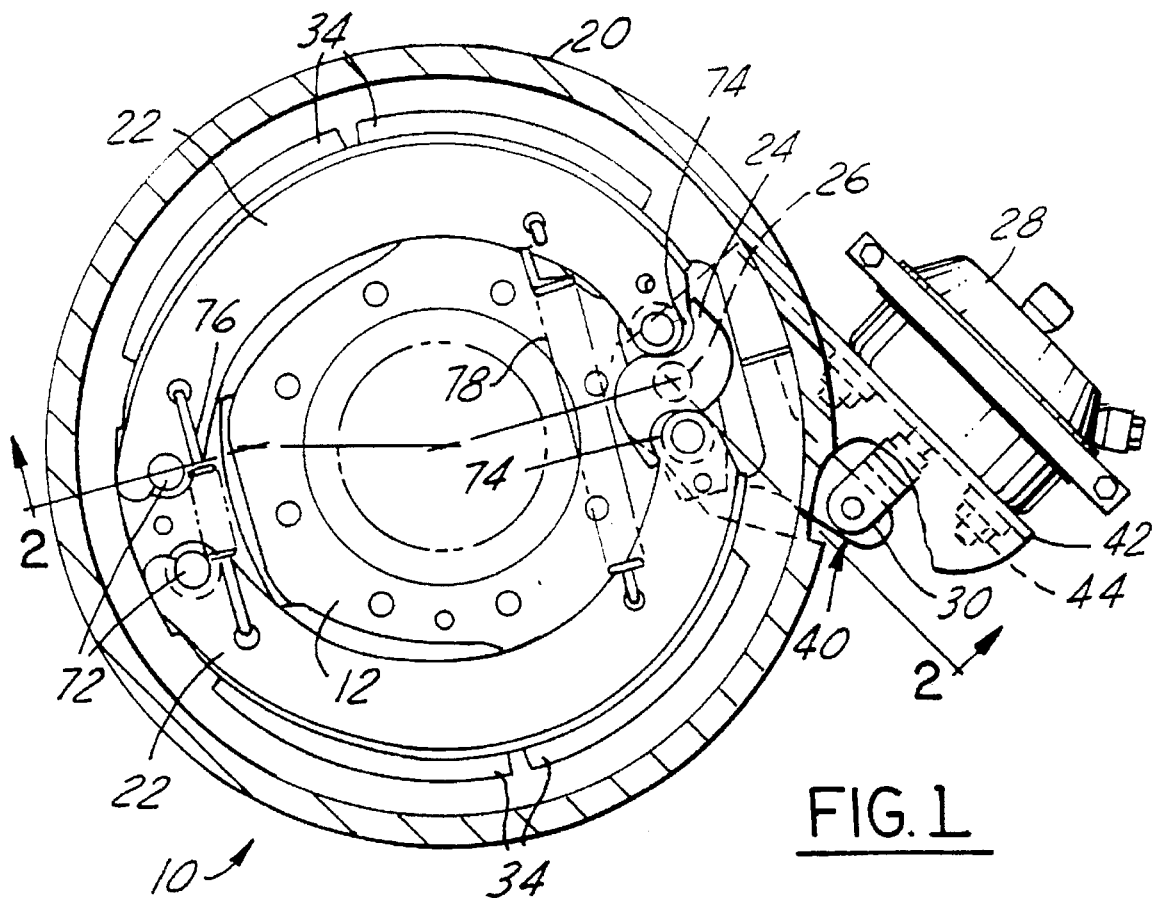
FIG. 1
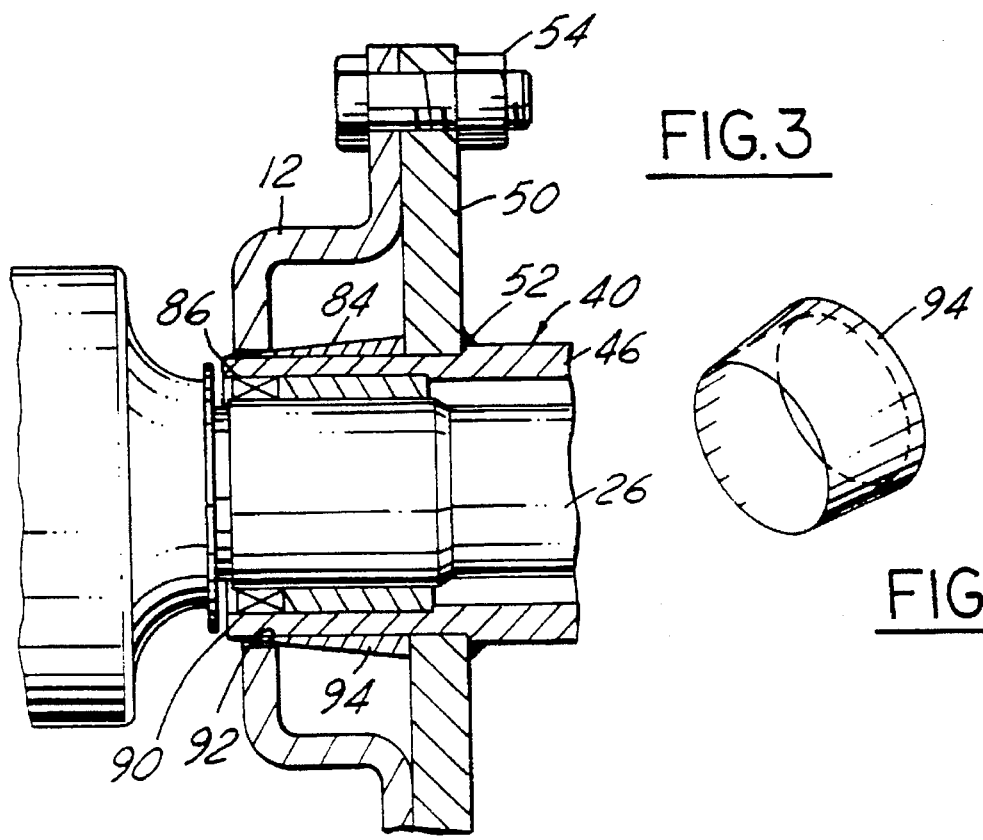
FIG. 3
FIG. 4

BRAKE BRACKET ASSEMBLY

This application is a continuation of Ser. No. 08/282,179 filed Jul. 29, 1994, now abandoned.

TECHNICAL FIELD

The present invention relates to vehicle brake systems and more particularly to bracket members used to attach brake actuating mechanisms to brake assemblies.

BACKGROUND ART

This invention is directed to bracket members for vehicle brake systems. The actuating motors or mechanisms (e.g. air brake cylinders) for brake assemblies are typically connected to the brake assemblies by an elongated bracket member. The actuating mechanism operates to rotate a cam shaft which forces the brake shoes to engage the brake drum. The actuating mechanism is typically connected to the brake assembly or brake drum by an elongated bracket member.

Due to the various structures and configurations of vehicles, including large trucks, it is often necessary to position the actuating mechanism a considerable distance from the brake drum and brake assembly. This requires the use of longer bracket members and longer force moments to operably connect the actuating mechanism with the brake assembly. Also, for larger vehicles, such as trucks and the like, the actuating mechanisms are relatively large and heavy which puts added stress and torque on the bracket members.

In use, significant torsional and bending forces are placed on the bracket members due to the length of the bracket member, the weight of the actuating mechanism, and/or the condition of the roads on which the vehicles are traveling. These forces can be substantial and can weaken the bracket member. In particular, it has been found that bracket members which are welded to the brake assemblies may fail at one of the welded joints.

SUMMARY OF THE INVENTION

It is an object of the present invention to provide an improved bracket member for a vehicle braking system. It is another object of the present invention to provide a brake system in which the bracket member connecting the actuating mechanism to the brake assembly is secured in an improved manner.

In accordance with the present invention, a bracket member is provided which is connected at least in two separate places to the brake assembly. The bracket member has a wing bracket for mounting the actuating mechanism at one end, a mounting plate for connection to the brake assembly at the other end, and a tubular or hollow housing member positioned between the wing bracket and mounting plate. The tubular housing is preferably welded to the wing bracket and mounting plate.

The mounting plate is securely affixed to the spider of the brake assembly. In addition, the tubular housing extends through the mounting plate and is separately secured to the spider. The tubular housing can be connected to the spider by a press-fit, interference fit or the like. In this regard, the end of the tubular housing can be knurled or splined to provide a force fit engagement, or the end can be tapered and secured in place when the bracket member is fastened to the brake assembly. It is also possible to provide a wedge or shim positioned between the housing and the brake assembly spider in order to securely connect the two members together.

Other objects, features and advantages of the present invention will become apparent from the following description of the invention, when viewed in accordance with the accompanying drawings and the appended claims.

BRIEF DESCRIPTION OF THE DRAWINGS

FIG. 1 is a side elevational view, partly in cross-section, of a cam actuated vehicle brake assembly;

FIG. 3 illustrates one embodiment of the invention;

FIG. 4 illustrates a wedge-type connector member; and

BEST MODE(S) FOR CARRYING OUT THE INVENTION

Figure 2:
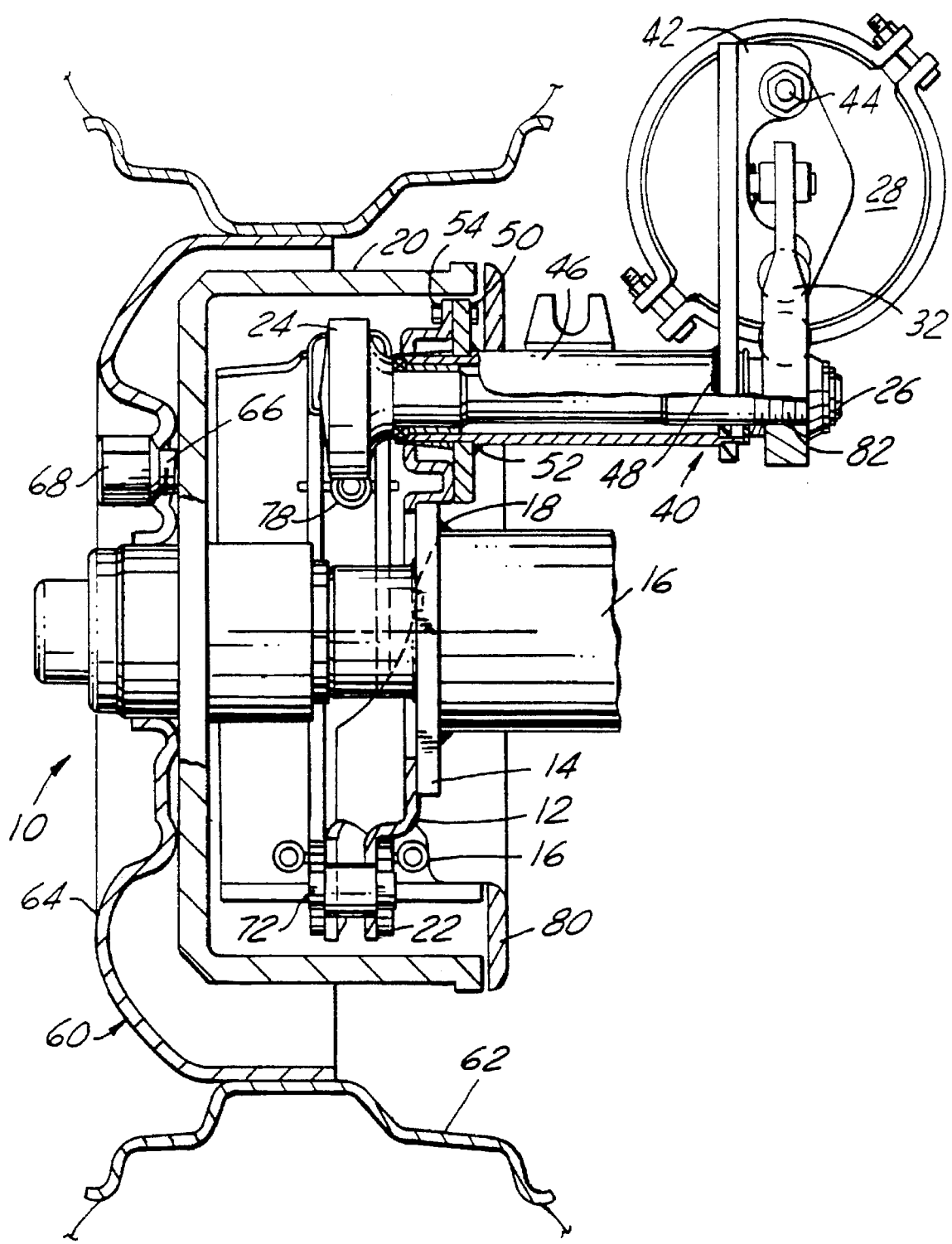
FIG. 2 is a cross-sectional view of the brake assembly of FIG. 1 when taken along lines 2—2 of FIG. 1 and in the direction of the arrows.

FIGS. 1 and 2 illustrate use of the present invention with a cam-actuated brake assembly 10. In this regard, although the present invention will be described and shown in combination with a cam-actuated brake assembly 10, it is understood that the present inventive vehicle brake bracket member can be used with any type of brake assembly.

The brake assembly 10 includes a stamped metal spider 12 secured to a flange 14 which in turn is welded to a vehicle axle 16. The weld is indicated by the reference number 18.

The brake assembly 10 is comprised of a brake drum 20, a pair of brake shoes 22, a brake actuating cam member 24 forged on the end of a cam shaft 26, and a spring brake actuating motor or mechanism 28. The actuating motor 28 has a reciprocating brake actuating rod 30 and a lever 32 operatively connecting the brake actuating rod 30 and the camshaft 26. The brake shoes 22 are each respectively provided with friction linings 34.

The actuating motor 28 is supported by a bracket member 40 which connects the motor to the brake assembly 10. The actuating motor 28 is positioned on a wing bracket 42 by bolts 44 or other conventional fasteners. The wing bracket 42 is secured as by welding to a tubular member 46. The weld is shown by the reference number 48 in FIG. 2. The tube 46 in turn is welded near its other end to a mounting plate 50, the weld being shown by the reference number 52. The mounting plate 50 is secured to the spider 12 of the brake assembly 10 by a plurality of bolts or other fasteners 54.

As shown in FIG. 2, the brake assembly is adapted to be positioned inside a wheel 60 of a vehicle. The wheel 60 includes a rim member 62 and a central disk member 64. The disk is connected to the brake drum 20 by a plurality of lugs 66 and lug nuts 68. As is conventionally known, a tire (not shown) is mounted on the rim 62 of the wheel 60.

The brake shoes 22 are each respectively mounted for pivotal movement about pins 72 which are affixed to the spider 12. The opposite ends of the brake shoes 22 are provided with roller followers 74 which are biased into engagement with the S-type brake actuating cam 24 by spring members 76 and 78.

The brake assembly 10 as thus far described, is well known in the art and is normally operated by depression of the brake pedal of the vehicle which supplies fluid pressure, usually air, to the service brake chamber of actuating motor 28. Air pressure is independently supplied to the auxiliary brake chamber to compress the spring brake while the vehicle is in operation and has brake air pressure. The fluid pressure operating on a piston or diaphragm in the service chamber of the actuating motor 28 forces the actuating rod 30 outwardly of the motor housing thereby rotating the lever 32 and camshaft 26 about the axis of the camshaft 26.

Rotation of the camshaft 26 transmits forces through the roller followers 74 which in turn causes the brake shoes 22 to pivot about the pivot pins 72 until the brake shoe linings 34 are pressed into frictional contact with the inside of the brake drum 20. This causes the wheels to stop turning and in turn stops the vehicle.

When the brakes are released, that is when the brake pedal is allowed to return to its rest position, fluid pressure is exhausted from the service chamber of actuator motor 28 and the actuating rod 30 and lever 32 are returned to the normal positions as shown in FIGS. 1 and 2. When the fluid pressure is exhausted from the service chamber of actuating motor 28, the brake shoes 22 and linings 34 are returned by springs 76,78 to their normal operating positions as shown in FIG. 1 where a clearance space is provided between the linings 34 and the inside of the brake drum 20. The springs 76,78 acting through the brake shoes 22 and roller followers 74, also assist in returning the cam 24, camshaft 26, and lever 32 to their normal non-braking positions.

A dust shield 80 is normally provided on the interior of the brake assembly 10 in order to protect the actuating components from dust, dirt and other elements. In addition, the brake assembly 10 as shown in the drawings, includes an automatic slack adjusting mechanism 82. The slack adjusting mechanism can be of any conventional type, such as that shown in U.S. Pat. Nos. 3,949,840 or 4,926,980.

A first embodiment of the invention is shown in more detail in FIG. 3. As shown, the mounting plate 50 of the bracket assembly 40 is attached to the spider 12 of the brake assembly by a plurality of bolts or other conventional fasteners 54. The hollow tube 46 of the bracket assembly 40 is welded to the mounting plate 50 by a 360° weld 52. The camshaft 26 of the brake assembly is positioned inside the hollow tube 46. A bushing 84 is positioned in the tube 46 to rotatably support the camshaft 26. In addition, a seal 86 is provided at the outer end of the tube 46 adjacent the bushing 84. The seal is preferably an oil lip-type seal with a central spring and can be of any conventional type. The open end 90 of the tube 46 is held securely in place in the opening 92 of the spider 12 by a conical wedge member 94. The wedge member is shown in perspective view in FIG. 4.

With this embodiment of the invention, the bracket member 40 which connects the actuating mechanism 28 to the brake assembly 10 is tightly and positively connected to the brake assembly at two separate locations. The fasteners 54 hold the mounting plate to the spider member of the brake assembly while the wedge member 94 helps hold the end 90 of the bracket member securely in place at a second location. It has been found that providing a second structural connection between the bracket member and the brake assembly results in a significantly longer life of the bracket member. In this regard, the second structural connection between the spider and the end of the tubular member reduces the torsional and bending forces which otherwise would be present at the weld joint 52. Vertical shaker tests have shown that approximately 2 to 5 times longer life is secured for the bracket member when there are two structural connections between the bracket member and the spider as opposed to merely one structural connection at the mounting plate.

Figure 5:
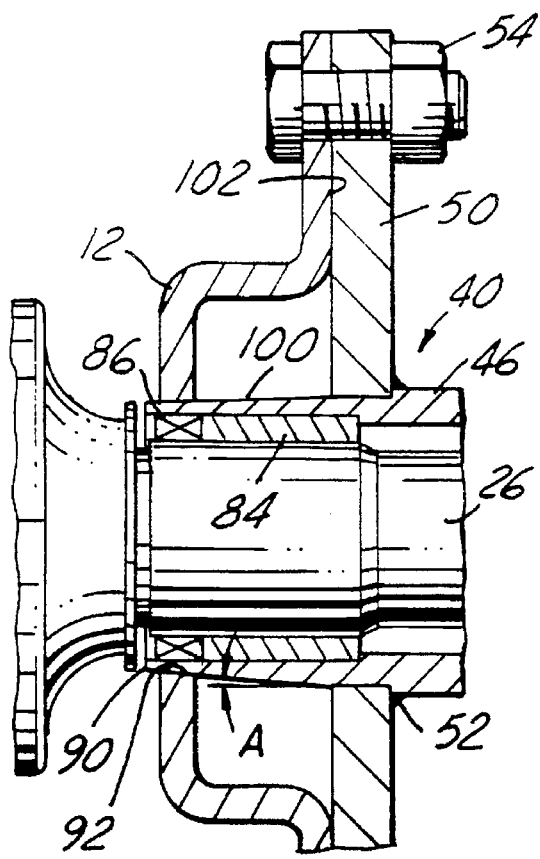
FIGS. 5–7 illustrate alternate embodiments of the invention.

Another embodiment of the invention, and perhaps the preferred embodiment of the invention at this time, is shown in FIG. 5. In this embodiment, the end 90 of the tubular member 46 of the bracket member 40 has a tapered or sloped surface 100. The tapered or sloped surface can be a circular taper of angle A which is shown in exaggerated form for illustration purposes, or the end of the tubular member can have a series of tapered flats around its circumference or perimeter. Preferably the taper of angle A is 2–4°, although it can be of virtually any angle so long as it accomplishes the purposes of the present invention. In this regard, the tapered section 100 on the tubular member 46 is sized such that it fits tightly in the opening 92 in the spider 12 when the mounting plate 50 is drawn tightly against the spider 12 by securing of fasteners 54. That is, when the fasteners 54 are tightened and the mounting plate 50 is pulled against the surface 102 of the spider 12, the tapered surface 100 on the end of the tubular member 46 will become wedged in a tight interference fit with the opening 92 of the spider.

As another alternative embodiment, it is also possible to provide an interference fit between the end 90 of the tubular member 46 and the opening 92 in the spider 12. In this manner, when the components are joined together, the end 90 of the tubular member 46 will fit tightly and securely in the opening 92 of the spider 12. In order to provide this interference or press fit, the end of the bracket member 40 is press fit by conventional machinery and procedure when the brake system is being assembled. Merely tightening the fasteners 54 would normally be insufficient to provide the appropriate interference or press fit.

A pinch joint could also be utilized to secure the end of the tubular member 46 to the spider.

Figure 6:
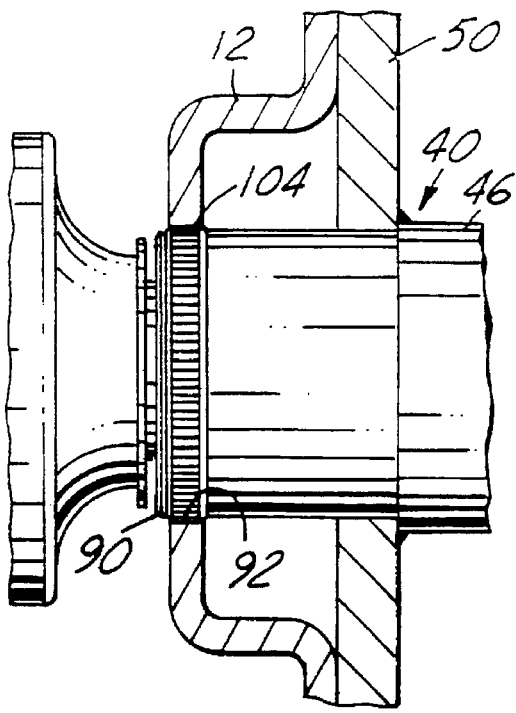
Figure 7:
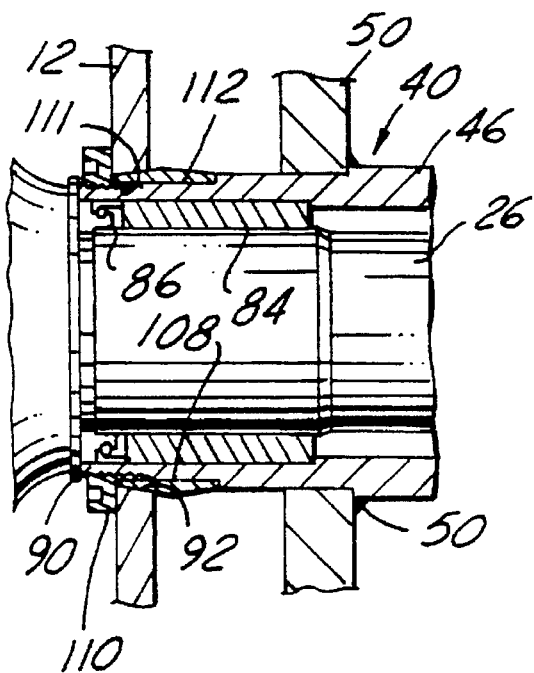

Two additional alternate embodiments of the present invention are shown in FIGS. 6 and 7. In FIG. 6, the end 90 of the tubular member 46 has a knurled or splined portion 104 around its circumference or perimeter. In this regard, the knurled or splined portion can either be provided as part of the tubular member 46 itself, or it can be a separate member welded or otherwise securely attached to the end of the tubular member 46. In order to assemble the embodiment together as shown in FIG. 6, the tubular member and thus the bracket member 40 is press fit into the opening 92 in the spider 12.

In the embodiment shown in FIG. 7, a compression fitting 108 and spanner nut 110 are utilized. The compression fitting 108 is an annular member which is positioned in a recess 112 adjacent the end 90 of the tubular member 46. The compression fitting 108 is sized to fit snugly in the opening 92 in the spider 12. The spanner nut 110 is an annular member which fits over the end 90 of the tubular member 46 and is threaded on its inside surface. The outer surface 112 of the end 90 of the tubular member 46 is threaded correspondingly to mate with the threads on the spanner nut 110. Thus, in the embodiment shown in FIG. 7, when the bracket member 40 is assembled and connected to the brake assembly, the end 90 of the tubular member 46 is positioned in the opening 92 in the spider 12. Then, the spanner nut 110 is threaded onto the end 90 of the tubular member 46 and tightened against the spider 12. This compresses the compression fitting 108 and provides a tight structural connection between the end of the bracket member and the spider of the brake assembly.

As shown by the various examples of the structural connections, the present invention firmly connects the bracket member to the spider at two locations in a manner which can be disassembled for service if needed. This is preferred. It is also possible, however, to secure the end of the bracket member to the spider in a more permanent manner, such as by welding, which also comes within the broad scope of the present invention.

Although particular embodiments of the present invention have been illustrated in the accompanying drawings and described in the foregoing detailed description, it is to be understood that the present invention is not to be limited to just the embodiments disclosed, but that they are capable of numerous rearrangements, modifications and substitutions without departing from the scope of the claims hereafter.

It is claimed:

1. A bracket assembly for a vehicle brake system including a brake drum, a brake shoe, a brake actuating cam shaft, and spider member, said bracket assembly comprising:

a bracket member comprising a tubular member;

a mounting plate member;

said tubular member having a first end and a second end, said brake actuating cam shaft rotationally supported and positioned within said tubular member, wherein rotation of said brake actuating cam shaft causes said brake shoe to frictionally contact said brake drum;

said mounting plate member being secured to said tubular member adjacent said second end; and tapered interference first connection means on said second end of said tubular member for being securely connected to said spider member, and a second connection means connecting said mounting plate member to said spider member;

whereby the structural connection of said first and said second connection means connecting the tubular member, spider member and mounting plate member results in a significantly longer life of the bracket assembly.

2. A bracket assembly in accordance with claim 1 wherein said connection means on said tubular member comprises a knurled member.

3. A bracket assembly as set forth in claim 1 wherein said connection means on said tubular member comprises a compression fitting and a spanner nut mechanism.

4. The braking system as set forth in claim 1 wherein the tapered means has a taper of 2–4°.

5. The braking system as set forth in claim 1 wherein said securement between said mounting plate member and said connecting member comprises a weld joint.

* * * * *